L. TESTA.
GREASE CELLAR FOR LOCOMOTIVES.
APPLICATION FILED AUG. 21, 1917.
1,269,330.
Patented June 11, 1918.
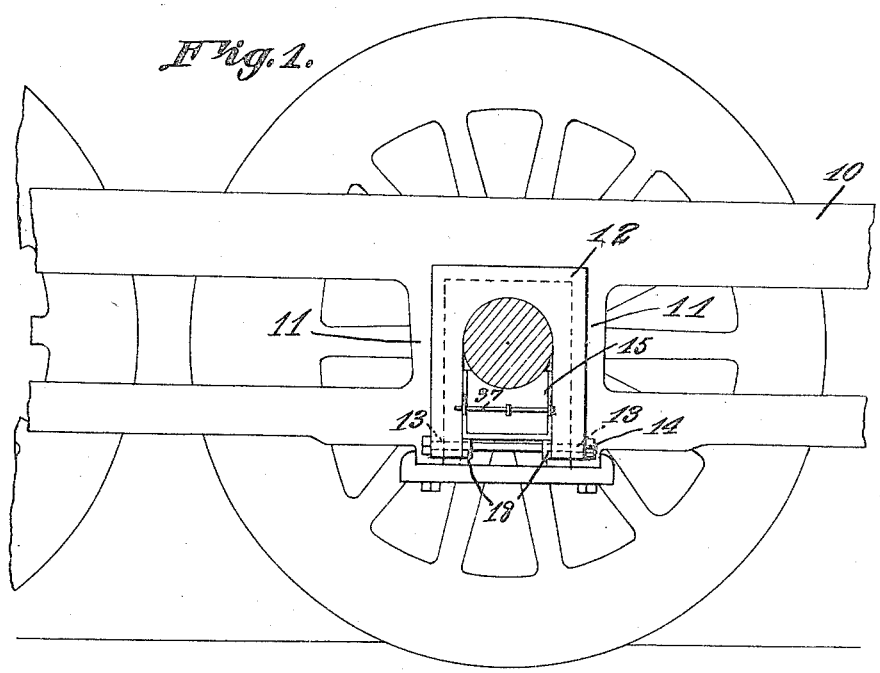
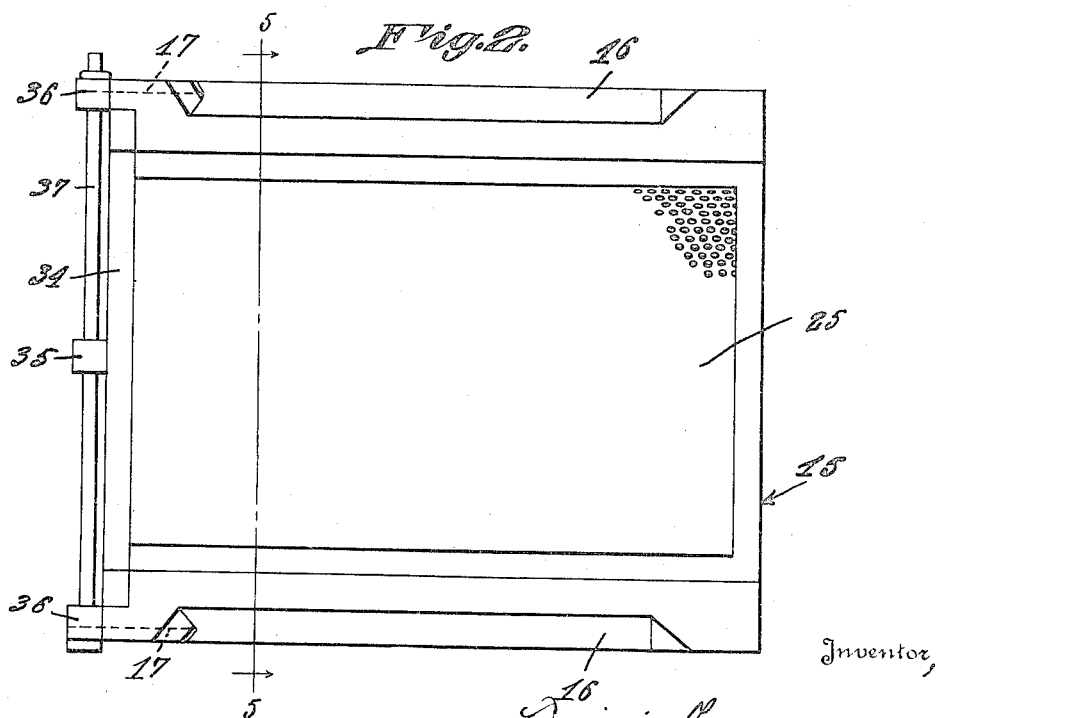

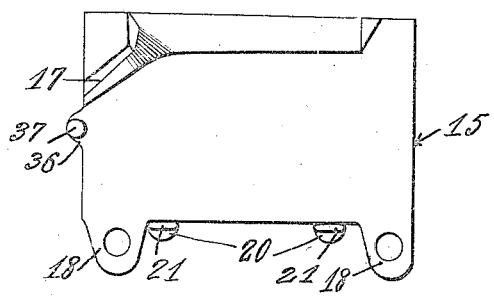
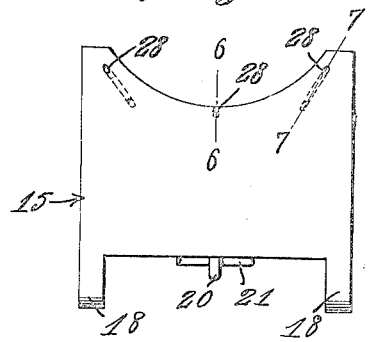
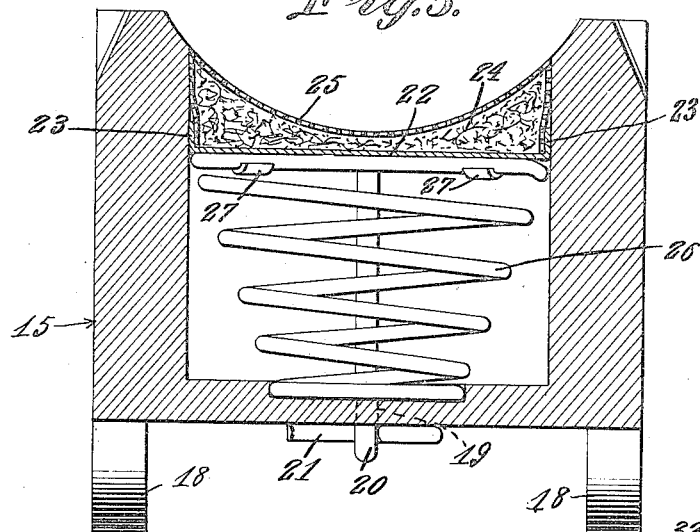
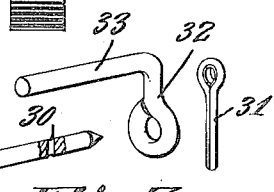
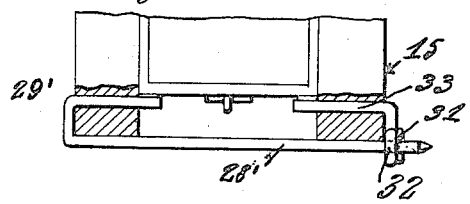

UNITED STATES PATENT OFFICE.

LUIGI TESTA, OF GRAFTON, WEST VIRGINIA.

GREASE-CELLAR FOR LOCOMOTIVES.

1,269,330.  Specification of Letters Patent.  Patented June 11, 1918.

Application filed August 21, 1917. Serial No. 187,439.

*To all whom it may concern:*

Be it known that I, LUIGI TESTA, a subject of the King of Italy, and resident of Grafton, in the county of Taylor and State of West Virginia, have invented certain new and useful Improvements in Grease-Cellars for Locomotives, of which the following is a specification.

This invention relates to journal bearing lubricators and particularly to novel means for lubricating the drive shafts of locomotives.

An object of this invention is to produce a grease cellar associated with a journal bearing, the same having provision for forcing the grease into engagement with the journal, novel means being also provided for permitting the escape of cuttings occasioned by the friction between the bearing and journal, thus making it possible to prevent undue friction which is usually present when cuttings are confined and contact the wearing surfaces of the bearing or journal.

A further object of this invention is to provide novel means whereby a grease cellar may be supported in operative relation to the journal in case of fracture or disablement of the grease cellar supporting means which, in ordinary types, comprise the bolts which extend through apertured lugs on the cellar and through apertures in the journal bearings, the purpose of the present invention being to provide novel means for suspending or supporting the oil or grease cellar in case the apertured lugs become broken or impaired.

A still further object of this invention is to produce a grease cellar which requires a comparatively small amount of lubricant as compared with those now in common use, so that the invention is comparatively inexpensive to manufacture and at the same time, it is economical to operate and the consumption of lubricant is materially reduced as compared with the grease cellars now used.

With the foregoing and other objects in view, the invention consists in the details of construction, and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 is a view in elevation of a fragment of a frame of a locomotive with the drive shaft in section;

Fig. 2 is a plan view of the grease cellar;

Fig. 3 is a view in side elevation of the grease cellar;

Fig. 4 is a view in elevation of one end thereof;

Fig. 5 is a transverse section;

Fig. 6 is a sectional view on the line 6—6 of Fig. 4;

Fig. 7 is a sectional view on the line 7—7 of Fig. 4;

Fig. 8 is a view in elevation partly in section of a fragment of the journal bearing with a fragment of the grease cellar with means for supporting the grease cellar; and Fig. 9 is a perspective view of the grease cellar support, the parts being detached.

In these drawings 10 denotes a fragment of a frame of a locomotive, and 11 the frame legs between which the journal box 12 is supported in known manner, but as the construction of the frame, legs, and the manner of holding the box therein does not constitute a part of the present invention, they are not further described in detail.

The box 12 has apertures 13 at its lower end which, under normal conditions, receive the bolts 14 by which the grease cellar 15 is supported, the said grease cellar comprising a housing, the side surfaces of which are beveled at their upper edges as at 16 to produce clearances for the escape of cuttings which may be dislodged during the rotation of the journal. The side surfaces also have ducts or channels 17 which communicate with the beveled surfaces so that the cuttings and lubricant which escapes from the journal bearing may find an exit and be released.

The housing has apertured lugs 18 at its lower corners and these apertured lugs receive the bolts 14 by which the grease cellar is held in place in operative relation to the journal and within the box 12.

The floor of the housing has apertures, such as 19, therein, in which a guide rod 20 is slidable, the said guide rod having an eye in its lower end under the floor of the housing for the reception of a pin 21 which limits the upward movement of the said guiding rod. Two or more of these guiding rods are preferably employed and their upper ends are connected to a follow plate 22 which preferably has side flanges 23 and this follow plate comprises what may be termed a pan in which lubricant 24 such as hard grease or lubricating pad may be applied and the lubricant is preferably covered by a shield or apertured screen 25 which permits the lubricant to be forced into engagement with the journal bearings and pass through the apertures in so doing.

The perforations or apertures in the shield are preferably $\frac{3}{32}''$ in size and it has been found in practice that the said dimensions or size of the apertures is important as producing the best results; although in cold weather it might be desirable to use slightly larger mesh, $\frac{5}{32}''$ or more.

A spring 26 preferably of the spiral type encircles each of the guide rods between the floor of the housing and the plate 22 and the upper end of the spring is held preferably in engagement with the plate by clips or hooks 27 so that the springs operate to press the follower plate or presser head upwardly, thus exerting pressure on the lubricant so that it will be pressed and caused to pass through the apertures of the screen.

The end of the grease cellar which is contiguous to the hub of the driving wheel or the plate which is often interposed between the bearing and the driving wheel is provided with diagonally disposed ducts 28 through which grease may be forced so that friction occasioned by the thrust movement of the journal is minimized by reason of the lubricant which reaches the contacting faces of the rotating parts.

The size of these ducts should be relatively small to avoid impairing the strength and durability of the end of the grease cellar.

As a means for holding the grease cellar in operative relation to a bearing in the event of the lugs breaking, I have provided a sling or support to be substituted for the bolt 14 and have provided means for holding the same in place in operative relation to the journal bearing and the grease cellar.

In carrying this feature of the invention into practice, I utilize a rod 28' having an integral hook 29' which projects through an aperture of the journal box which is intended to receive the bolt 14 and the said rod is provided with an aperture 30 for the reception of a cotter pin 31. The end of the rod having the aperture projects through an eye 32 of the short rod 33 which also projects into an aperture of the box intended to receive the bolt 14 and when the parts are in the assembled relation shown in Fig. 8, they will operate to suspend or support the grease cellar and this has been found an expeditious and comparatively inexpensive means for suspending or supporting broken grease cellars.

By reason of the construction of the well, in the manner stated, the casing is of unusual strength and is sufficiently rigid to permit the jacking of a locomotive by placing the jack under the grease cellar.

One end of the grease cellar is closed by a door 34 with an apertured lug 35 thereon and the ends of the sides of the cellar have apertured lugs 36 which receive the rod 37 by which the door is held closed.

I claim—

1. In a grease cellar for locomotives, a journal box having an opening in its lower end, said grease cellar comprising a casing, said casing having its outer walls beveled and provided with channels communicating with the beveled portions for the escape of cuttings, a follow plate in the casing, springs for pressing the follow plate upwardly and an apertured shield through which the grease is forced.

2. In a grease cellar for locomotives, a journal box having an opening in its lower end, said grease cellar comprising a casing, said casing having its outer walls beveled and provided with channels communicating with the beveled portions for the escape of cuttings, a follow plate in the casing, springs for pressing the follow plate upwardly, an apertured shield through which the grease is forced, one end of the said grease cup having oil ducts therein.

3. In a grease cellar for locomotives, a casing, a journal box having apertures, a rod having a hooked end extending through the aperture of the journal box and adapted to support the cellar, a rod adapted to extend through another aperture of the journal box for supporting the cellar, the second mentioned rod having an eye therein for the reception of the first mentioned rod, and means for preventing the disconnection of the rod from said eye.

LUIGI TESTA.